United States Patent [19]
Schmidt

[11] Patent Number: 5,365,442
[45] Date of Patent: Nov. 15, 1994

[54] SONIC RANGING GRADE LEVEL CONTROLLER

[75] Inventor: Douglas C. Schmidt, Blaine, Minn.

[73] Assignee: Thermedics, Inc., Waltham, Mass.

[21] Appl. No.: 780,149

[22] Filed: Oct. 21, 1991

[51] Int. Cl.$^5$ .......................................... A01B 63/114
[52] U.S. Cl. .................. 364/424.07; 37/348; 37/382
[58] Field of Search .............. 364/424.07; 56/D15; 37/348, 382

[56] References Cited

U.S. PATENT DOCUMENTS

| | | | |
|---|---|---|---|
| 3,083,327 | 3/1963 | Byloff | 318/202 |
| 3,703,574 | 11/1972 | van den Berg | 423/462 |
| 3,736,486 | 5/1973 | Gould | 318/624 |
| 3,851,451 | 12/1974 | Agness et al. | 56/10.2 |
| 4,136,508 | 1/1979 | Coleman et al. | 56/208 |
| 4,430,846 | 2/1984 | Presley et al. | 56/10.2 |
| 4,437,295 | 3/1984 | Rock | 56/10.2 |
| 4,561,064 | 12/1985 | Brüggen et al. | 364/561 |
| 4,573,124 | 2/1986 | Seiferling | 364/424 |
| 4,663,712 | 5/1987 | Kishida | 364/424 |
| 4,733,355 | 3/1988 | Davidson et al. | 364/424 |
| 4,750,704 | 6/1988 | Brundage | 251/30.02 |
| 4,840,263 | 6/1989 | Kato et al. | 192/109 F |
| 4,873,817 | 10/1989 | Harms | 56/10.2 |
| 4,891,796 | 1/1990 | Sekine | 367/96 |
| 4,914,593 | 4/1990 | Middleton et al. | 364/424.07 |
| 4,976,149 | 12/1990 | Ichikawa et al. | 73/597 |
| 5,155,983 | 10/1992 | Sheehan et al. | 56/10.2 |
| 5,170,342 | 12/1992 | Nakamura et al. | 364/167.01 |
| 5,235,511 | 8/1993 | Middleton et al. | 364/424.07 |

Primary Examiner—Thomas G. Black
Assistant Examiner—Julie D. Day
Attorney, Agent, or Firm—David George Johnson

[57] ABSTRACT

An implement position control device including a central processing unit (6) coupled to an ultrasonic transducer (17) and receiver/amplifier (20) adapted to calculate the distance to a reference target (12 and a relatively more distant surface (9). Control pulses are initiated by the CPU (6) to manipulate a solenoid (25) by means of a valve driver (24) in response to the calculated distance measurements. An autotune task (26) causes a series of precise pulses to manipulate the solenoid, thereby permitting calculation of the transfer function (52) defining the relationship between pulse width and implement position.

19 Claims, 6 Drawing Sheets

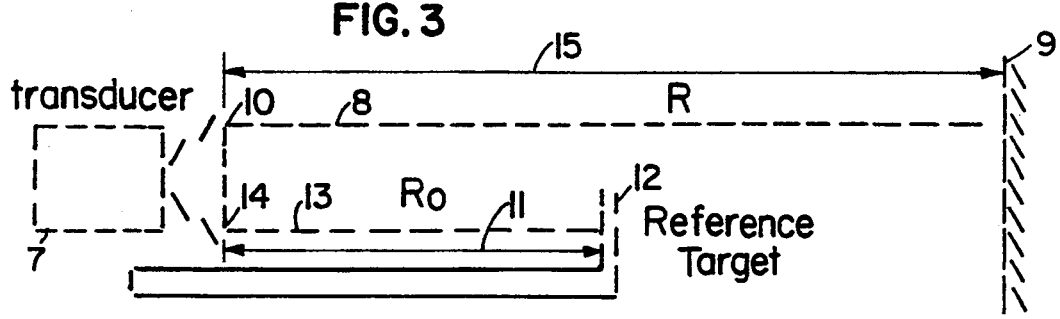
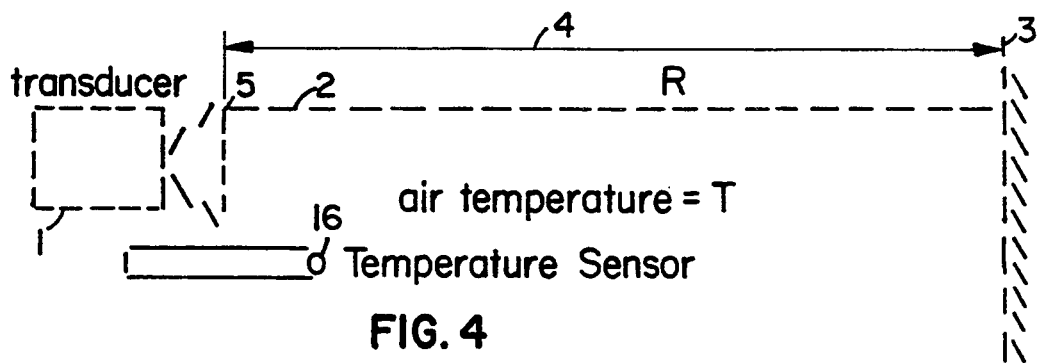
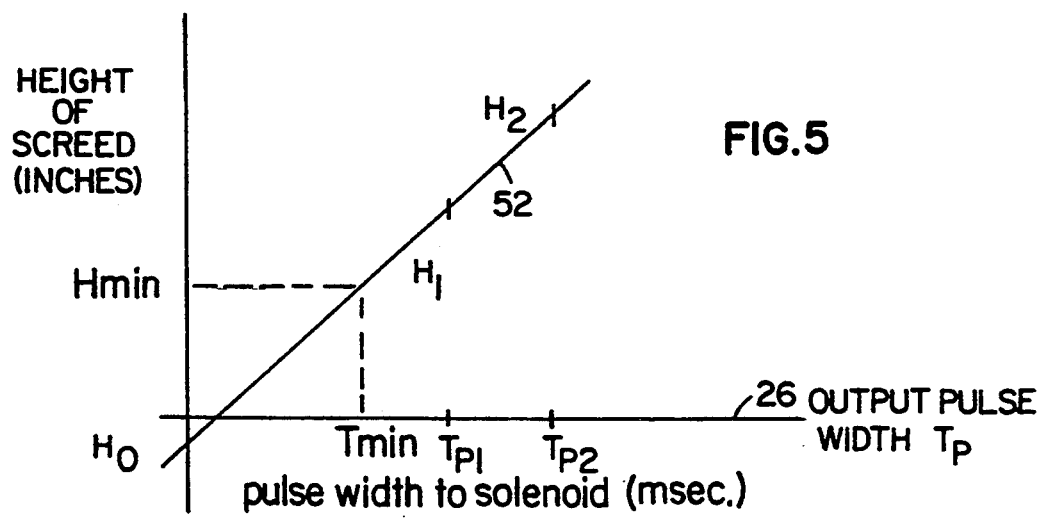

SONIC RANGING GRADE LEVEL CONTROLLER

BACKGROUND OF THE INVENTION

1. Field of the Invention

This invention relates to a method of and apparatus for controlling the position of a grading implement relative to a datum by utilizing a non-contact distance sensor. More particularly, the invention relates to a method of and apparatus for controlling the position of grading implement comprising the steps of beginning a measurement cycle with a command generated by a central processing unit to cause a driver to power a sonic transducer, the transducer producing a short burst of ultrasonic waves which are sensed by a receiver which will detect signals returning both from a datum and from a compensation target, the central processing unit thereafter recording the number of clock cycles that have occurred between the beginning of the measurement cycle and the reception of the return signals, thereby allowing the central processing unit to logically determine if a temperature compensation target, reference target, and measured surface signal has been received, and to calculate the distance to the measured surface.

2. Description of Related Technology

Motor graders, bulldozers, pavers, road construction vehicles, earth moving vehicles and certain agricultural equipment are often called upon to either produce or sense a graded surface that follows a predetermined datum. In areas of new construction, for example, the datum might be defined by a string line supported by stakes placed adjacent to the path to be graded. In areas of reconstruction, the datum might be defined by a preexisting curb or pavement surface. On the other hand, the crop gathering header of a harvester combine, for example, travels as close to the nominally level surface of the ground as possible in order to gather and harvest low-lying feed crops such as soybeans.

Various devices have been used on earth moving and agricultural vehicles to position the grading or harvesting implements to obtain the desired graded surface or crop gathering header profile. The grading implements of these vehicles are usually positioned by hydraulic cylinders that are coupled to mechanisms that support the grading implements. A typical positioning device includes a datum sensing device that is mounted on the grading implement and that senses the position of the datum relative to the implement, and a control device that signals the hydraulic cylinders to reposition the implement accordingly. The cutting mechanism carried by the crop gathering header of a harvester combine frequently encounters surface rises and depressions in the contour of the terrain which cause the header to bounce and occasionally dig the crop cutting mechanism into the ground. The header should be maintained am a minimum position above the ground in order to avoid picking up stones and running the cutting mechanism into the ground. Header height controls are known for the purpose of detecting ground contour variations and signalling them to hydraulically or electrically operated power devices which then adjust the height of the header above the ground, with sufficient lead time so as to prevent the cutting mechanism from digging into the ground.

In the context of paving applications, the datum must be sensed by a device such as a string follower, which is used where the datum is defined by a string line that is suspended a constant distance above the desired graded surface. A sensor unit is attached to the side of the grading implement nearest the string line, and a pivotablee wand extends from the sensor unit and touches the string line. The sensor is responsive to the rotational position of the wand as an indication of the position of the implement relative to the string datum. The wand is often spring loaded against the string line to ensure contact. One drawback to the use of the string follower is that if the spring force is excessive, or if the string line is loosely strung, then the spring force of the wand can displace the string line from its intended position and thereby introduce grading errors. Another drawback is that the operator must stop grading and get out of the cab in order to set the wand onto the string line. Another drawback is that if the wand falls off of the string line, then the sensor indicates a large positional error and tries to correct the position of the implement accordingly, thus causing gouges or other discontinuities in the graded surface. Still another drawback is that the wand mechanism typically has limited adjustability which restricts the location of the string line relative to the desired surface.

In an agricultural context, known header height controls have a "dead band" within which the control is disabled when the header height is between the "raise" and "lower" dead band limits at which the height sensors actuate the electrohydraulic power device to respectively raise and lower the header, and some controls also have means to vary the width of such a dead band. However, most known header height controls require that the operator stop the combine and climb down from the cab in order to vary the dead band. Further, it is difficult to adjust both dead band and height to obtain optimum settings in most known header height controls.

Other datum sensing devices include wheels and skids, which are useful where the datum is defined by a preexisting curb or previously graded surface. A sensor unit is usually mounted to the side or rear of the grading implement, and a projecting arm pivots downward to place the wheel or skid on the datum surface. The sensor unit responds to the rotational position of the arm as a measure of the position of the implement relative to the datum surface. One major drawback to the use of wheels and skids is that they are typically designed for forward movement of the vehicle, so that in order to allow the vehicle to back up, the wheel or skid must be lifted. If the vehicle backs up without lifting such a wheel or skid, then the mounting mechanism may bend or break.

Known header height controls include a four bar mechanical linkage including a turnbuckle which actuates a rotatable cam which operates "raise" and "lower" limit switches that derive electrical command signals for "raise" and "lower" solenoids. The header height set point represents the midpoint in the travel of the rotatable cam between the "raise" dead band limit at which the cam operates the "raise" limit switch and the "lower" dean band limit at which it operates the "lower" limit switch. The header height set point is adjusted by the operator getting out of the cab and changing the length of the turnbuckle in the four bar mechanical linkage and similarly the dead band is adjusted by changing the position of the hole in a radial link of a four bar linkage in which the turnbuckle is engaged.

Examples of other Height sensors include U.S. Pat. No. 3,704,574, issued to Gardner, which discloses a mechanical system associated with header height sensors for moving a valve stem in or out, depending upon the movement of the header height sensor above or below a predetermined setting.

U.S. Pat. No. 3,851,451, issued to Agness et al., discloses an automatic height control system having a number of individually operable ground followers or height sensors which are associated with switches electrically connected to a solenoid valve for controlling the vertical movement of a header of a crop gathering unit.

U.S. Pat. No. 4,136,508, discloses an automatic header height control for the crop gathering header of a combine which permits the operator to change the desired height setting from the operator's platform without stopping the combine and to adjust the dead band within which the header can move from a height setting without generating a correction signal from the operator's platform and do so without stopping the combine. The dead band adjust mechanism includes a potentiometer.

U.S. Pat. No. 3,736,486 discloses a dead band control circuit and a servo control system for a digital serve motor control and drive system which is particularly useful in controlling a servo motor used in editing images in a motion picture film to videotape transfer system. The dead band control circuit includes an adjustable potentiometer whereby the dead band can be adjusted accurately by adjusting the wiper arm of the potentiometer.

U.S. Pat. No. 3,083,327, issued by Byloff, discloses a dead band control system in which, at the edge of the modulated band, full power pulses are generated for moving a valve motor in a clockwise direction or in a counterclockwise direction to move a valve element. Smaller signals which normally would have little effect are utilized to provide control current pulses of full power and varying pulse duration to extend the circuit operation past and into the dead band zone. These control current pulses provide "inching" operation of the valve motor.

U.S. Pat. No. 4,437,295, issued to Rock, discloses a pulsing automatic header height control which provides a very small dead band zone with no control within the dead band zone, by providing a system which is utilized for controlling the height of a header as opposed to a butterfly valve element in an air duct.

U.S. Pat. No. 4,573,124, issued to Seiferling, discloses a height control in which the distance to the ground is determined and electrical signals corresponding to the distance are generated. A control circuit receives the signals and provides "up" and "down" pulses. A monitoring and controlling circuit receives the "up" and "down" pulses and transmits them to a power device for actuating an incremental step up or step down for each pulse. The monitor determines whether a preselected number of consecutive "down" pulses occur without an "up" pulse between them and within a short predetermined time period and, if not, actuates a circuit disabling and overriding the power device only when a preselected number of "down" pulses occurs within a predetermined time period.

U.S. Pat. No. 4,561,064, issued to Bruggen et al., discloses an ultrasonic pulse beam system which is located externally of a motor vehicle and projects a beam to a fixed reflector located on the vehicle. The device includes three threshold timing levels based on the distance between the transducer and the sensed surface, and generates three distinct frequencies in response thereto. To compensate for ambient conditions and dirt on the transmitters, timing intervals can be changed by providing a calibrating input based on actual transit time from the transmitter to the fixed reflector.

U.S. Pat. No. 4,663,712, issued to Kishida, discloses a method of controlling an implement level comprising the steps of averaging the time periods measured by a non-contacting distance sensor, comparing the preset target data with the measured and averaged data, computing difference between them and raising or lowering the implement in accordance with the magnitude of the difference. When averaging the measured data, certain abnormal data which causes erroneous readings is omitted prior to averaging.

Finally, U.S. Pat. No. 4,733,355, issued to Davidson et al., discloses a non-contacting range sensing and control device for controlling the position of a grading implement relative to a datum. The device includes a reference circuit which defines consecutive first, second and third timing intervals for comparing the separation distance between the transducer and a target. A comparison circuit generates error signals if the separation distance falls into the first or third intervals, but generates no error signal if the separation distance is within the limits of the second interval.

SUMMARY OF THE INVENTION

The present invention is a device for controlling and monitoring the movement of a blade, screed, or other implement attached to a vehicle and traveling over a surface which may be sloped, irregular, or substantially planar. The present device utilizes a single chip microprocessor including built-in or onboard read-only memory. The driven time of the transducer is typically only a few cycles.

The device also includes a transducer of the piezoelectric type, which continues to oscillate for a number of cycles after the drive signal is removed. During the "post drive" period, the central processing unit is in an "inhibit" mode, thereby eliminating extraneous signals.

The reflected transducer signals are received by a high gain amplifier circuit including a pulse shaper circuit as an output.

Also included are "raise" and "lower" output drivers which are on-off devices designed to operate hydraulic valve spools directly. A proportional output driver may be included having a serial digital output.

Two software-controlled counters that are internal to the central processing unit accumulate counts related to the distance to a temperature compensation target and to a measured surface. The software locks the interrupt input for a short period of time following the transmit pulse, thereby eliminating interference from the transmission. Timer control software determines if the incoming signal is within the time range allowable for the reception of the temperature compensation target. If the target is missed, the software records that event. When the compensation signal is received the counter is stopped. When the surface measurement return signal is received its counter is also stopped, thereby recording two values.

Manipulation of the data results in the generation of an error correction algorithm which results in a series of line segments forming a continuous function having multiple slopes. In this way, an error signal is continuously generated, thereby contributing to a "dithering" function at small error correction levels, thereby causing the solenoid valve to be continuously manipulated. Continuous manipulation or "dithering" of the solenoid valve permits precise movement of the solenoid without having to compensate for startup time, static friction, or other transient phenomena associated with a truly stationary solenoid valve.

BRIEF DESCRIPTION OF THE DRAWINGS

FIG. 3 is a schematic diagram showing the principle of compensation by means of a reference target as employed by the present invention;

FIG. 4 is a schematic diagram showing compensation by means of temperature measurement as employed in the present invention;

FIG. 5 is a graph showing characteristics of the actuator as utilized in the present invention;

DETAILED DESCRIPTION OF THE PREFERRED EMBODIMENT

Figure 1:
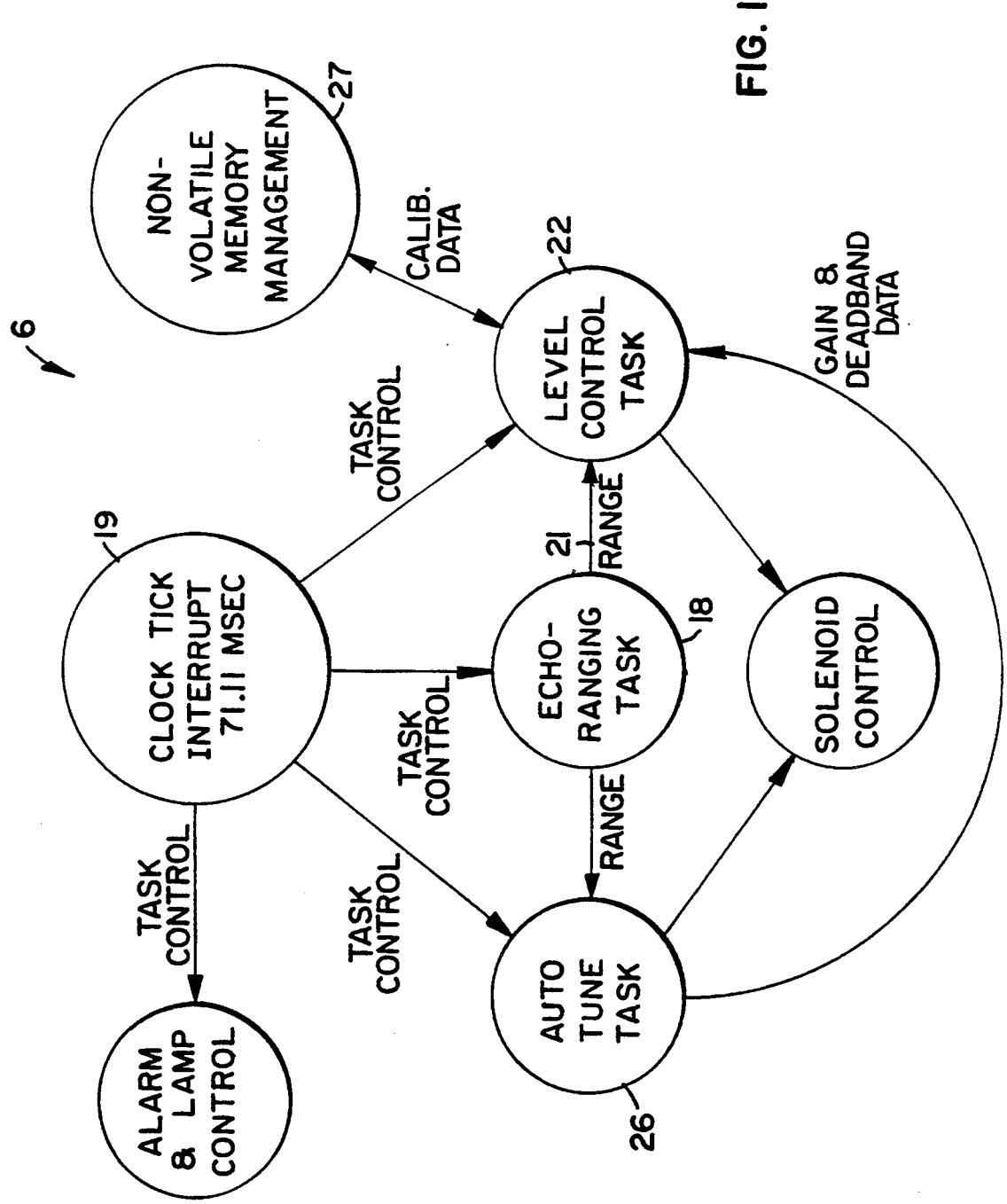
FIG. 1 is a flow chart showing the architecture of the software of a grade controller built according to the principles of the present invention.

Referring to FIG. 4, the basic equation for sonic range finding can be understood. Typically, a transducer 1 emits a sonic wave, usually in the range of between 25,000 to 250,000 Hertz. The emitted wave follows a linear path 2 until it encounters a solid, or at least reflective, surface 3. The sonic wave reflects from surface 3 and returns to the transducer 1 along path 2. The length 4 of path 2 can be determined by the following equation:

$$R = C/2 \cdot T$$

where

R equals the length of path 4;

T equals the elapsed time that the sonic wave traveled starting at the time it was emitted from point 5 from transducer 1 until the same sonic wave returned to point 5 along path 2; and C equals the speed of sound.

Assuming that air is an ideal gas, the speed of sound in the atmosphere is equal to:

$$Ks \cdot \sqrt{T},$$

where Ks is a constant based on the variation of atmospheric density with temperature, and T is the temperature in absolute degrees Kelvin (°K.).

Figure 2:
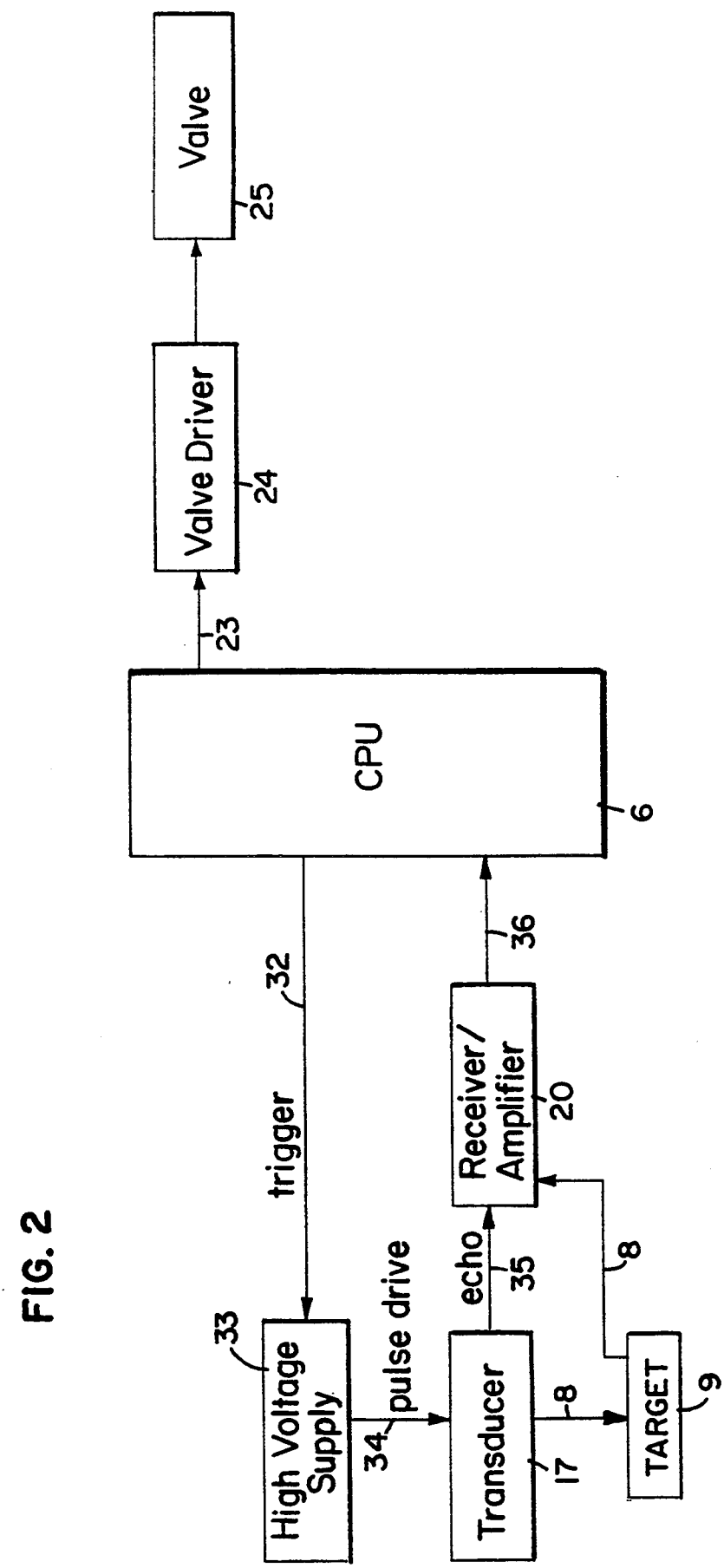
FIG. 2 is a block diagram of a grade controller built in accordance with the principles of the present invention.

For example, C=1,089 feet per second at 0° C. (273° Kelvin). If the absolute temperature is known, an accurate measurement of the speed of sound may be obtained by means of a look-up table, which, for example, may be stored as part of central processing unit 6 as shown in FIG. 2.

A second method for compensating for the temperature dependence of the speed of sound while performing ultrasonic or sonar ranging is shown in FIG. 3. Transducer 7 emits a sonic wave along path 8, the sonic wave eventually encountering a solid or reflective surface 9. The sonic wave is reflected from surface 9 and returns along path 8 to its point of origin 10 at transducer 7. Mounted at some known distance 11 from transducer 7 is a reference target 12. Some of the sonic energy emanating from transducer 7 travels along path 13 and encounters reference target 12, where it is reflected along path 13 to re-encounter the transducer 7 at its point of origin 14 An equation expressing the distance 15 between point 10 and surface 9 can be expressed as follows:

$$R = Ro/To \cdot T,$$

where

R equals the actual range to the measured surface;

Ro equals the distance to the reference target, which is a known, fixed constant value;

To equals the elapsed time of the sonic wave traveling from the transducer, encountering the reference target and returning to the transducer; and T equals the elapsed time for the sonic echo to leave the transducer, encounter the measured surface, and return to the transducer.

By using each of the two methods just described, transient and gradient temperature effects, as well as absolute temperature effects, can be accommodated. For example, the temperature sensor 16, which may be a device such as the LM-335, cannot respond to a sudden or "step" change in ambient temperature. Typically, the thermal lag of such a device is approximately 20 seconds. Therefore, sudden temperature changes such as those caused by wind gusts or the like cannot be instantaneously tracked by the LM 335 sensor 16.

The reference target 12 mode of temperature compensation is capable of tracking instantaneous changes in temperature only if the temperature is constant along the entire measurement path 8, that is, at all points between the sonic transducer 7 and the measured surface 9.

In reality, the ambient temperature existing between the sonic transducer 7 and the reference target 12 may be different than the temperature in the atmosphere between the sonic transducer 10 and the measured surface 9. In that case, the echo delay times as measured for the reference target 12 and the measured surface 9 can be analyzed to detect trends concerning the specific nature of the temperature differences along measurement path 8. This analysis can be accomplished by detecting changes in each individual echo delay time relative to previous echo delays received from the same point. Three different trends are possible.

First, the reference target 12 echo delay and the measured surface 9 echo delay can both change proportionately. This is the ideal case which requires no additional correction, since it indicates that the temperature gradient is constant across the entire measured path 8.

The second case occurs when the reference target 12 echo delay has changed, but the measured surface 9 echo delay does not change. In that case, the reference target 12 echo data is probably erroneous. Since the echo delay from the measured surface 9 did not change, it is improbable that the temperature along path 8 changed. Since the reference target 12 is located between the sonic transducer 7 and the measured surface 9, the most reasonable inference is that the reference target 12 echo should have undergone no change. In this case, the reference target 12 echo data should be ignored for that particular ranging cycle.

The third case occurs when the measured surface 9 echo delay changes, but the reference target 12 echo delay did not change. In that case, a reasonable inference is that a thermal change did occur between the reference target 12 and the measured surface 9. If the rate of change in the distance between transducer 7 and measured surface 9 is known to have an upper limit, the rate of change in measured distance 15 can be tested against that limit, and the range data for that cycle can be ignored if the upper limit is exceeded. Another solution to this problem is to position the reference target 12 as closely as possible to the measured surface 9, or to time average the range readings and suffer a corresponding loss in response time of the control system.

Referring to FIGS. 1 and 2, general operation of the software of the present invention can be understood. All control functions of the present invention are based on information derived from the ultrasonic echo ranging function 18.

Figure 6A:
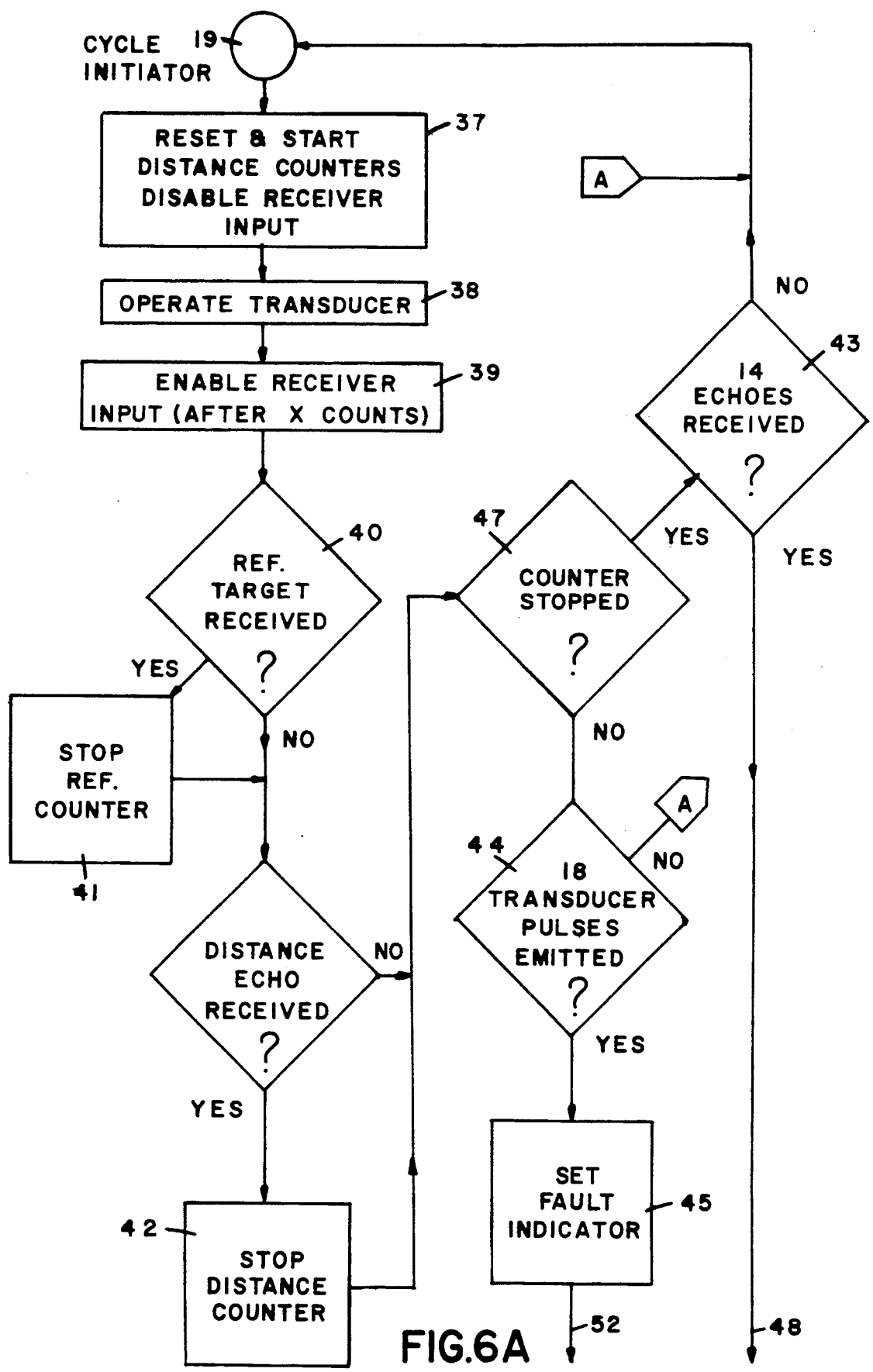
FIGS. 6a and 6b are a flow chart showing the software as utilized in the present invention.
Figure 6B:
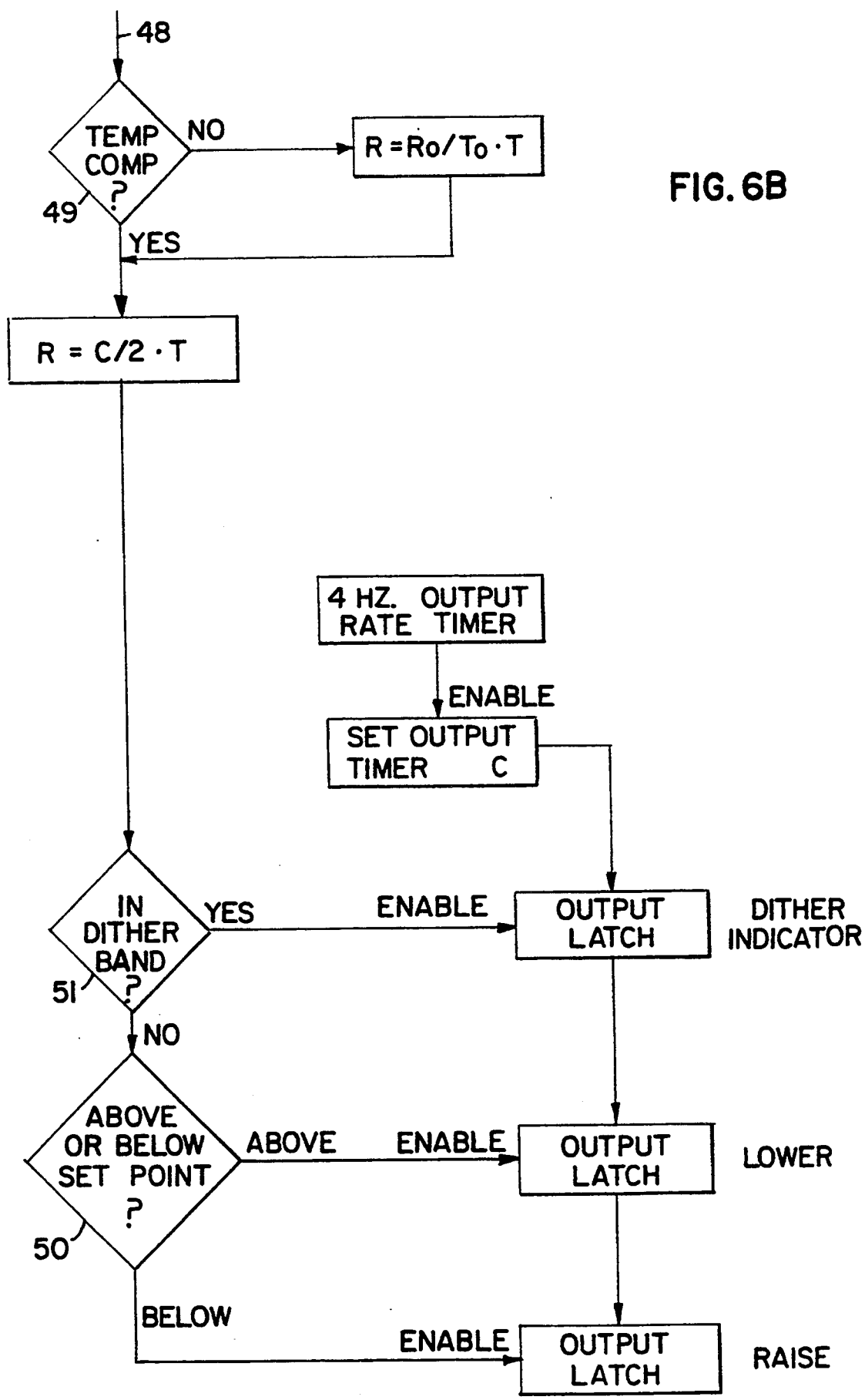
Figure 7:
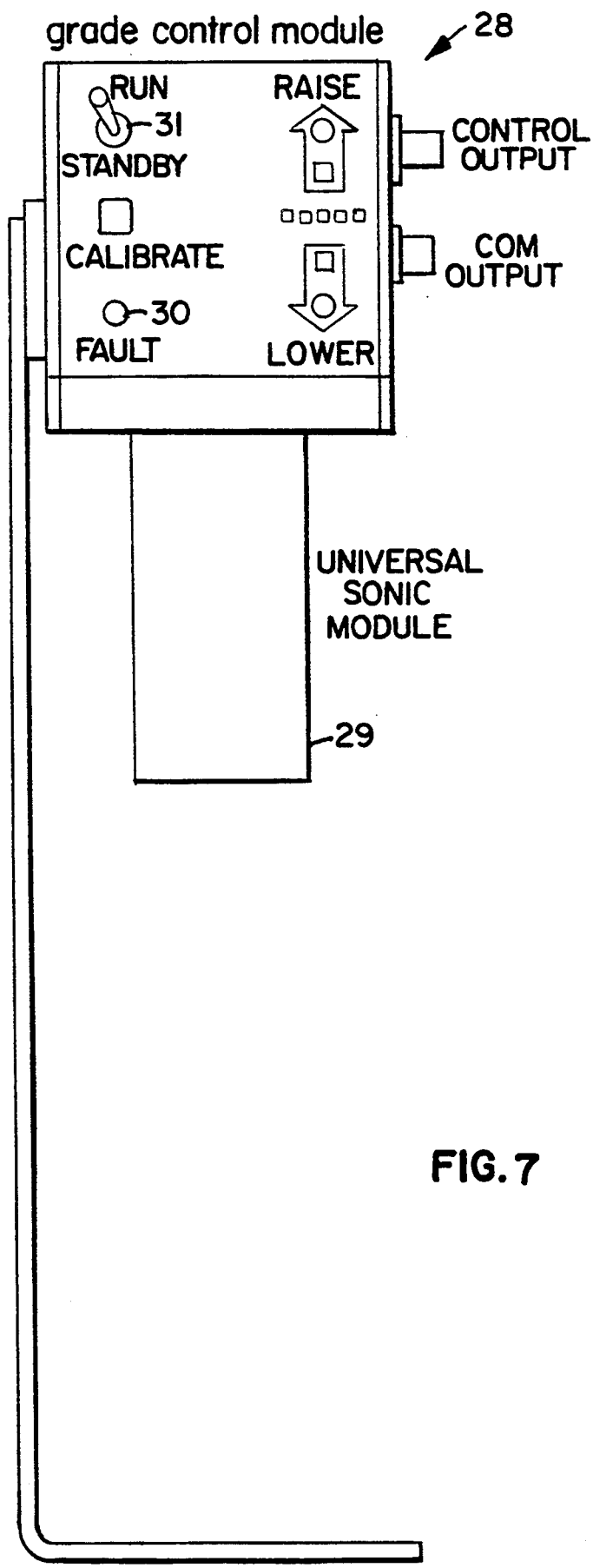
FIG. 7 is a side elevation of a control module as utilized in the present invention.

The range finding function 18 is performed by emitting a 100 to 300 microsecond burst of ultrasonic energy from a transducer 17 and measuring the delay or elapsed time for any sound echoes from one or more targets encountered by the wave front produced by the transducer 17. The central processing unit 6 typically initiates the echo ranging task 18 by emitting a trigger pulse along signal path 32, which is electrically connected to high voltage supply 33. High voltage supply 33 thereafter exits a high voltage enabling or exciting pulse along signal path 34 to transducer 17, thereby causing transducer 17 to emit a sonic pulse along path 8. In practice, transducer 17 and a receiver/amplifier 20 are collocated in a universal sonic module 29 as seen in FIG. 7, and are in electrical communication with each other along signal path 35. Receiver/amplifier 20 data is forwarded to CPU 6 along signal path 36. Referring to FIG. 6, scheduler or cycle initiator 19 actually begins the measurement cycle by resetting and starting the distance counters at step 37, as well as disabling the receiver/amplifier 20 input in preparation for the operation of the transducer at step 38. The next step 39 is to enable the receiver/amplifier 20 after an appropriate delay, after which return echoes would be expected to be received.

The echo ranging task 18 performs two range finding cycles during each time period allocated to the echo ranging task 18 by the CPU scheduler or cycle initiator 19. The first of the two cycles is performed at the start of the allocated time period, whereas the second cycle is performed at or near the midpoint of the time period.

During each range finding cycle, the echo ranging task 18 is programmed to sense or detect two echoes. The first echo will be received at step 40 from the reference target 12 located at a fixed distance 11 from the transducer 7. Echo data from the reference target 12 is used to detect changes in the speed of sound by measuring the echo delay to the target 12 of known distance, as heretofore discussed. The second received echo will be from the measured surface 9, which is the object or surface which is of primary interest to the implement or device being manipulated by the controller or valve driver 24 of the present invention. For both echoes, the echo ranging task 18 establishes windows or time periods within which the respective echo must occur in order to be detected. The reference target window 41 establishes boundaries surrounding the echo delay time corresponding to the known range of the reference target, which is typically 8½ inches within a tolerance of plus 25% to minus 12%. The measured surface 9 window 42 establishes boundaries for sensing the echo delay time corresponding to the known minimum and maximum range of the measured surface 9, typically 12 inches to 40 inches. These windows or time boundaries ensure that the central processing unit 6 will ignore any echoes outside of the expected time interval for the respective echo source.

The echo ranging task 18 reserves consecutive time periods and continues to accumulate echo data until either the receiver amplifier 20 has accumulated 14 echoes from the measured surface at step 43 or the transducer 17 has emitted 18 ultrasonic pulses at step 44.

If 14 echoes are not acquired in 18 attempts, a status flag (fault indicator) is set at step 45 to denote that occurrence, and the ranging task 18 is then deactivated. Under this condition, the generation of control pulses is inhibited by proceeding via program path 52 and sending only "dither" pulses to the valves as described below.

If 14 echoes from the measured surface are sensed by receiver amplifier 20, enough ranging data has been acquired. The distance 15 which is computed is based on the average of the 14 samples. The central processing unit 6 also monitors for the presence of echo data which may have been received from the reference target 12. This data is accumulated and averaged regardless of whether the reference target 12 is used to compensate for changes in the speed of sound, C.

If enough echo data from the measured surface 12 has been acquired, the central processing unit 6 will proceed along program path 48 to compute the actual distance 15 to the measured surface 9. The central processing unit 6 will use one of the two available methods to temperature compensate the distance readings, namely measure temperature from the LM-335 temperature sensor 16, or echo delay data from the reference target 12, which is set at a known distance from the transducer 17. The choice of compensation method is made at step 49 at the time of calibration. The reference target method of temperature compensation will always be chosen if echoes are being received from the expected location of the reference target at the time calibration was initiated by the operator. Once the actual range distance 15 is computed, the echo ranging task 18 is deactivated.

Data produced by the echo ranging task 18 is sent along path 21 to the level control task 22, which compares at step 50 the actual range 15 to the measured surface 9 with the preprogrammed distance set point, which is an indication of the desired distance of the implement or screed from the measured surface 9. The level control task 22 thereby creates an error signal, and depending on the sign of the error, one of two actuator characterization tables is selected. The actuator characterization table is a set of data which defines the control response of the hydraulic actuators to pulses sent along path 23 by CPU 6 to the hydraulic solenoid valve drivers 24. The central processing unit 6 examines the magnitude of the range error as determined by level control task 22 and utilizes the appropriate characterization table to compute the time duration of the correction pulse which must be sent to the valve driver 24 so as to result in the magnitude of the error being lessened or removed. The computed correction pulse is sent to the appropriate valve driver 24.

Within each control cycle, each solenoid valve 25 is also dithered. Dithering is the process of periodically sending a short pulse to the solenoid valve 25 for the purpose of moving the hydraulic valve spool a distance that is slightly less than the distance required to cause an actual change in height of the hydraulic positioner. Dithering keeps the valve spool from seating fully in an "off" position, and also keeps the valve seals riding on an oil film. The result is faster and more consistent solenoid valve response, since static friction and other inertial forces are either substantially reduced or eliminated altogether.

Another task is the interim task (not shown) which has the function of continuing the correction or dither pulse initiated by the control task 22, as well as starting the dither pulse for the alternate solenoid valve when the primary pulse is finished. Also, the interim task, after the alternate dither pulse is finished, waits for a specific delay time before initiationing the next echo ranging cycle.

Referring to FIG. 5, the actual level of control algorithm utilized by level control task 22 may be understood. The basic control method is linear, or straight line proportional. In other words, the output pulse width Tp, which appears on the "x" axis 26 in FIG. 5, that is sent to the hydraulic solenoid field effect transistor driver 24, is directly proportional to the error between the measured and desired distance to the measured surface 9.

The graph of FIG. 5 shows the relationship between the width of the control pulse sent to the solenoid as compared to the change in height of the screed, which is directly related to the change in extension of the hydraulic cylinder. Note that there is a minimum pulse width "Tmin", below which there is no change in screed movement because he valve spool has not moved far enough to allow hydraulic fluid to flow into the cylinder. Note also that there is a minimum change in screed height "Hmin", which occurs because once the valve spool has opened, it will take a finite amount of time to close again. Depending on the balancing of the flow orifices in the valve body, Hmin may be quite small, but is unlikely to actually reach zero.

The activation of either of the solenoids causes the movement of a valve "spool" which reroutes the flow of hydraulic fluid to the hydraulic cylinder, causing the cylinder to either extend or retract, thus changing the height of the screed. The major delay involved in this process is the movement of the valve spool. This delay is a result of a number of factors: (a) the force applied to the valve spool by the solenoid; (b) the viscosity of the hydraulic fluid surrounding the valve spool; (c) the stiffness of the seals between the valve spool and valve body; and (d) the inertia of moving hydraulic fluid.

The gain or slope of the transfer function may be expressed by the equation:

$$dH/dTp = H2 - H1/Tp2 - Tp1$$

Thus, the equation of the transfer function is:

$$H(Tp) = (gain \cdot Tp) + H0.$$

The pulse width Tp may be calculated from the equation:

$$Tp = \epsilon - H0/gain,$$

wherein $\epsilon$ = the measured error in screed height;

$\epsilon = (gain \times Tp) + H0$ (from the transfer function equation).

Given the gathering and manipulation of data just discussed, another novel feature of the present invention is the "auto tune" task 26, which performs a complex sequence of steps which allow the central processing unit 6 to determine the characteristics of the actual hydraulic positioning system it is controlling. The auto tune algorithm is implemented by means of a software technique commonly referred to as "virtual machine". A virtual machine is a software model of another central processing unit (in this case, a specialized central processing unit). The "CPU" model is a specialized central processing unit which is emulated by the host central processing unit (for example, the 80C32). The virtual machine has its own program counter, stack pointer and stack. "Instructions" in the virtual machine are actually 80C32 ASM routines, each of which executes a discrete step in the overall "auto tune" sequence. The virtual machine incorporates an instruction fetch mechanism, virtual "call" and "return" routines, and "do" and "while" routines whose operation is analogous to those found in the "C" programming language. The "auto tune" task 26 itself can be described by the following steps:

(1) An operator initiates the "auto tune" mask by keyboard command. The task priority relationship between the level control task 22 and the auto tune task 26 is such that if auto tune is active, it will intercept all ranging data normally used by the level control task 22 and use it instead to perform the auto tune function. (2) Auto tune utilizes the reference target echo statistics and decides whether to use the reference target or the temperature sensor for speed of sound compensation. (3) Auto tune takes a final measurement of the present distance to the measured surface, and installs that value as the new range set point. (4) Auto tune then issues a test pulse of precisely measured duration to the "up" solenoid and measures the change in the measured distance to establish an initial estimate of the transfer gain (sensitivity) for the "up" control. (5) Auto tune then issues a test pulse of precisely measured duration to the "down" solenoid and measures the change in the measured distance to establish an initial estimate of the transfer gain (sensitivity) for the "down" control. (6) Auto tune then examines the present measured distance and issues a correction pulse to the appropriate "up" or "down" solenoid to restore the measured height of the Controller to that defined by the range set-point. The duration of the solenoid pulse is calculated from the initial estimate of the transfer gain (sensitivity) for respective control direction. Position correction is intended to keep the hydraulic system near the middle of its control range. (7) Auto tune then issues a "long" test correction pulse to the "up" solenoid and measures the change in the measured distance to establish the first point of the transfer function for an "up" correction. (8) Auto tune then issues a "long" test correction pulse to the "down" solenoid and measures the change in the measured distance to establish the first point of the transfer function for a "down" correction. (9) Auto tune then examines the present measured distance and issues a correction pulse to the appropriate "up" or "down" solenoid to restore the measured height of the Controller to that defined by the range set-point. The duration of the solenoid pulse is calculated from the estimate of the transfer gain (sensitivity) from the "long" test pulse in the respective control direction. Position correction is intended to keep the hydraulic system near the middle of its control range. (10) Auto tune then issues a "short" test correction pulse to the "up" solenoid and measures the change in the measured distance to establish a second point of the transfer function for an "up" correction. (11) Auto tune then issues a "short" test correction pulse to the "down" solenoid and measures the change in the measured distance to establish a second point of the transfer function for a "down" correction. (12) The two points acquired by the "long" and "short" test pulses for the "up" direction in steps 7 and 10 above are used to calculate the final transfer gain (sensitivity) for the "up" control. The gain is defined as the slope of line 52 on the graph of FIG. 2. Auto tune also computes the Y-axis intercept "Ho" of the graph line 52 giving the final control pulse/height change transfer function. In addition, the values for "Tmin" and "dither" for the "up" control are also calculated. The values of gain Ho, "Tmin" and "dither" are stored in the actuator characterization table for the "up" control. Note that these computations are made independently from those of the "down" actuator characterization table. (13) The two points acquired by the "long" and "short" test pulses for the "down" direction in steps 8 and 11 above are used to calculate the final transfer gain (sensitivity) for the "down" control The gain is defined as the slope of line 52 on the graph of FIG. 2. Auto tune also computes the Y-axis intercept "Ho" of the graph line 52 giving the final control pulse/height change transfer function. In addition, the values for "Tmin" and "dither" for the "down" control are also calculated. The values of gain, Ho, "Tmin", and "dither" are stored in the actuator characterization table for the "down" control. Note that these computations are made independently from those of the "up" actuator characterization table. (14) The auto tune task issues the command for both actuator characterization tables to be saved in the non-volatile random access memory 27. (15) The auto tune task sets the operating mode to automatic and deactivates itself. The level control task 22 immediately assumes control and maintains the established height set point.

Referring to FIG. 7, the physical appearance of a Grade control module 28 constructed in accordance with the principles of the present invention is shown. The universal sonic module 29 is shown which incorporates transducer 17 and receiver amplifier 20 as depicted in FIG. 2.

An alarm LED 30 appears on module 28 to indicate when any of 7 error conditions is detected. The alarm state remains active until the error is corrected, or in some cases, until battery power is removed.

The alarm state is indicated by the sequential blinking of the fault lamp. By counting the pulses that are emitted in groups by the lamp 30, the particular alarm may be identified. Every 9 seconds the alarm identifier pulse group is repeated. The following table summarizes the alarm codes:

| Number of Lamp Blinks | Alarm Condition |
| --- | --- |
| 1 | Over temperature (C) |
| 2 | Over voltage (C) |
| 3 | Reference target loss (C) |
| 4 | Over current on solenoid (C) |
| 5 | Open control loop (M) |
| 6 | Calibration fault (M) |
| 7 | Hardware fault (M) |

(C) signifies that the alarm is self-clearing; others must be cleared by powering off.
(M) signifies that the alarm is cleared by pressing the run/standby switch 31, which also places the controller in the standby mode.

The disclosure of the present invention is intended to be illustrative, but not limiting, of the scope of the invention, which is set forth in the following claims.

I claim:

1. A method of controlling the position of an implement in relationship to a surface, comprising the steps of:
   (a) selecting a desired relationship between the implement and the surface;
   (b) emitting a sonic wave;
   (c) detecting echoes produced by the reflection of the sonic wave from the surface; and
   (d) generating a correction signal which causes the implement to alter its relationship to the surface if a difference between a desired distance and a measured distance exceeds a certain amount, wherein a transfer function defining a relationship between the difference and the correction signal magnitude is linear.

2. The method of claim 1, wherein the step of measuring the distance between the implement and the surface further comprises the steps of:
   (a) detecting the echoes of the sonic wave from a reference target;
   (b) calculating a distance to the reference target;
   (c) comparing the calculated distance to the reference target to the known distance to the reference target;
   (d) calculating a compensation factor based on any discrepancy between the calculated distance and the actual distance to the reference target; and
   (e) applying the compensation factor to the calculated distance to the surface, thereby generating a corrected measurement of the distance between the implement and the surface.

3. A method of controlling the position of an implement in relation to a surface comprising the steps of:
   (a) selecting a desired relationship between the implement and the surface;
   (b) emitting a sonic wave;
   (c) detecting echoes produced by the reflection of the sonic wave from the surface;
   (d) detecting the echoes of the sonic wave from a reference target;
   (e) monitoring the rate of change of echo delays received from the reference target;
   (f) monitoring the rate of echo delays received from the surface;
   (g) comparing the rate of change of between the reference target echo delays and the surface echo delays;
   (h) recalculating the speed of sound based on reference target echo data only if the reference target echo data changed at a rate that was less than or equal to changes in the measured surface echo delay;
   (i) calculating a compensation factor based on any discrepancy between the calculated distance and the actual distance to the reference target;

(j) applying the compensation factor to the calculated distance to the surface, thereby generating a corrected measurement of the distance between the implement and the surface;

(k) generating a signal which causes the implement to alter its relationship to the surface if the difference between the desired distance and the measured distance exceeds a certain amount; and (l) generating a signal causing a solenoid operatively connected to the instrument to be continuously oscillated if the difference between the desired distance and the measured distance is less than a predetermined value.

4. The method of claim 2 further comprising the steps of:

(a) monitoring the rate of change of echo delays received from the reference target;

(b) monitoring the rate of change of echo delays received from the surface;

(c) comparing the rate of change between the reference target echo delays and the surface echo delays; and (d) recalculating the speed of sound based on reference target echo data only if the reference target echo data changed at a rate that was less than or equal to changes in the measured surface echo delay.

5. A method of controlling the position of an implement in relation to a surface, comprising the steps of:

(a) selecting a desired relationship between the implement and the surface;

(b) emitting a sonic wave;

(c) detecting echoes produced by the reflection of the sonic wave from the surface;

(d) detecting the echoes of the sonic wave from a reference target;

(e) calculating a distance to the reference target;

(f) comparing the calculated distance to the reference target to the known distance to the reference target;

(g) calculating a compensation factor based on any discrepancy between the calculated distance and the actual distance to the reference target;

(h) applying the compensation factor to the calculated distance to the surface, thereby generating a corrected measurement of the distance between the implement and the surface;

(i) generating a correction pulse which causes the implement to alter its relationship to the surface if the difference between the desired distance and the measured distance exceeds a certain amount, wherein a transfer function defining a relationship between the error and the pulse magnitude is linear; and (j) generating a signal causing a solenoid operatively connected to the instrument to be continuously oscillated if the difference between the desired distance and the measured distance is less than a predetermined value.

6. A method of determining the response characteristic of an implement control system for positioning an implement with respect to a surface, comprising the steps of:

(a) measuring a distance to the surface;

(b) manipulating the implement with respect to the surface;

(c) measuring any resulting variation in distance between the implement and the surface; and (d) calculating the relationship between the manipulation and the resulting variation of the implement relative to the surface, thereby determining the response characteristic of the implement control system.

7. The method of claim 6, further comprising the step of defining an exclusive time period during which the response characteristic of the implement control system is determined, thereby disabling the implement control system for use in other tasks.

8. The method of claim 7, wherein the step of measuring a distance to the surface further comprises the steps of:

(a) emitting an ultrasonic wavefront;

(b) detecting reflections of the ultrasonic wavefront from a reference target, the reference target being positioned in a known location;

(c) measuring ancient temperature;

(d) calculating the distance to the reference target;

(e) determining the distance to the reference target based on an ambient temperature assumption;

(f) comparing the calculated distance to the reference target with the known distance to the reference target;

(g) comparing any discrepancy between the known distance and the calculated distance to the reference target; and (h) choosing to omit further measurement of the calculated distance to the reference target if the discrepancy is in excess of the predetermined acceptable limits.

9. The method of claim 8, wherein the step of manipulating the implement with respect to the surface further comprises the steps of:

(a) sending a single control pulses of a predetermined and fixed time duration to an "up" solenoid, the "up" solenoid controlling the upward movement of the implement;

(b) analyzing any resulting change in implement height, thereby determining a preliminary relationship between the "up" control pulse duration and the distance of upward movement of the implement.

10. The method of claim 9, wherein the step of manipulating the implement with respect to the surface further comprises the steps of:

(a) sending a single control pulses of a predetermined and fixed time duration to an "down" solenoid, the "down" solenoid controlling the downward movement of the implement;

(b) analyzing any resulting change in implement height, thereby determining a preliminary relationship between the "down" control pulse duration and the distance of downward movement of the implement.

11. The method of claim 10, further comprising the step of returning the implement to a position near a central point of the range of position of the implement subsequent to determining the initial estimates of the characteristics of the "up" and "down" solenoids.

12. The method of claim 11, further comprising the steps of:

(a) utilizing the initial estimate of the relationship between "up" control pulse duration and the distance of upward movement of the implement determined by the steps described in claim 9 to compute an "up" control pulse width required to give a relatively large distance of upward movement of the implement, typically between 0.4" and 1.5";
(b) emitting the computed control pulse to the "up" solenoid;
(c) measuring the finite change in implement height resulting therefrom;
(d) computing a transfer function defining a relationship between control pulse duration and distance of upward movement of nine implement for a large implement motion.

13. The method of claim 12, further comprising steps of:
(a) utilizing the initial estimate of the relationship between "down" control pulse duration and the distance of upward movement of the implement determined by the steps described in claim 10 to compute a "down" control pulse width required to give a relatively large distance of downward movement of the implement, typically between 0.4" and 1.5";
(b) emitting the computed control pulse to the "down" solenoid;
(c) measuring the finite change in implement height resulting therefrom;
(d) computing a transfer function defining a relationship between control pulse duration and distance of downward movement of the implement for a large implement motion.

14. The method of claim 13, further comprising the step of returning the implement to a position near central point of the range of position of the implement subsequent to determining the initial estimates of the characteristics of the "up" and "down" solenoids.

15. The method of claim 14, further comprising the steps of:
(a) utilizing the initial estimate of the relationship between "up" control pulse duration and distance of upward movement of the implement determined by the steps described in claim 12 to compute an "up" control pulse width required to give a relatively small distance of upward movement of the implement, typically between 0.1" and 0.4";
(b) emitting the computed control pulse to the "up" solenoid;
(c) measuring the finite change in implement height resulting therefrom;
(d) computing a transfer function defining a relationship between control pulse duration and distance of upward movement of the implement for a small implement motion.

16. The method of claim 15, further comprising the steps of:
(a) utilizing the initial estimate of the relationship between "down" control pulse duration and the distance of upward movement of the implement determined by the steps described in claim 13 to compute a "down" control pulse width required to give a relatively small distance of downward movement of the implement, typically between 0.1" and 0.4";
(b) emitting the computed control pulse to the "down" solenoid;
(c) measuring the finite change in implement height resulting therefrom;
(d) computing a transfer function defining a relationship between control pulse duration and distance of downward movement of the implement for a small implement motion.

17. The method of claim 16, further comprising the steps of:
(a) computing the slope dH/dTp for the "up" control transfer function;
(b) computing a Y-axis intercept Ho for the "up" control transfer function; and
(c) computing the "dither" control pulse period for the "up" control transfer function.

18. The method of claim 17, further comprising the steps of:
(a) computing the slope dH/dTp for the "down" control transfer function;
(b) computing a Y-axis intercept Ho for the "down" control transfer function;
(c) computing the "dither" control pulse period for the "down" control transfer function.

19. The method of claim 18, further comprising the steps of:
(a) storing all values related to both the "up" and "down" transfer functions and the desired height of the implement relative to the surface in non-volatile memory;
(b) terminating the determination of the transfer function; and
(c) enabling automatic control of the position of the implement, thus maintaining the desired relationship between the implement and the surface.

* * * * *

UNITED STATES PATENT AND TRADEMARK OFFICE
CERTIFICATE OF CORRECTION

PATENT NO. : 5,365,442

DATED : November 15, 1994

INVENTOR(S) : Douglas C. Schmidt

It is certified that error appears in the above-identified patent and that said Letters Patent is hereby corrected as shown below:

Column 1, Line 10 - "of grading" should be -- of a grading --
Column 1, Line 57 - "am" should be -- at --
Column 2, Line 3 - "pivotablee" should be -- pivotable --
Column 2, Line 61 - "dean" should be -- dead --
Column 3, Line 25 - "serve" should be -- servo --
Column 6, Line 7 - "14 An" should be -- 14. An --
Column 9, Line 16 - "initiationing" should be -- initiating --
Column 9, Line 33 - "he" should be -- the --
Column 11, Line 19 - "gain Ho" should be -- gain, $H_o$ --
Column 11, Line 26 - "control The" should be -- control. The --
Column 12, Line 56 - "rate of" should be -- rate of change of --
Column 14, Line 18 - "ancient" should be -- ambient --
Column 14, Line 35 - "pulses" should be -- pulse --
Column 14, Line 48 - "pulses" should be -- pulse --
Column 14, Line 49 - "an" should be -- a --
Column 15, Line 9 - "nine" should be -- the --

Signed and Sealed this

Ninth Day of May, 1995

Attest:

BRUCE LEHMAN

Attesting Officer

Commissioner of Patents and Trademarks